(12) United States Patent
Laine et al.

(10) Patent No.: US 11,970,039 B2
(45) Date of Patent: Apr. 30, 2024

(54) METHOD AND A CONTROL UNIT FOR DETERMINING A PARAMETER INDICATIVE OF A ROAD CAPABILITY OF A ROAD SEGMENT SUPPORTING A VEHICLE

(71) Applicant: VOLVO TRUCK CORPORATION, Gothenburg (SE)

(72) Inventors: Leo Laine, Härryda (SE); Mats Jonasson, Partille (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 399 days.

(21) Appl. No.: 17/594,157

(22) PCT Filed: Apr. 5, 2019

(86) PCT No.: PCT/EP2019/058714
§ 371 (c)(1),
(2) Date: Oct. 4, 2021

(87) PCT Pub. No.: WO2020/200484
PCT Pub. Date: Oct. 8, 2020

(65) Prior Publication Data
US 2022/0161627 A1 May 26, 2022

(51) Int. Cl.
*B60G 17/018* (2006.01)
*B60G 17/0195* (2006.01)
(Continued)

(52) U.S. Cl.
CPC ..... *B60G 17/0182* (2013.01); *B60G 17/0195* (2013.01); *B60W 10/22* (2013.01);
(Continued)

(58) Field of Classification Search
None
See application file for complete search history.

(56) References Cited

U.S. PATENT DOCUMENTS 5,028,073 A 7/1991 Harms et al.
10,988,142 B1 * 4/2021 Mehrotra ............ B60W 40/068
(Continued)

FOREIGN PATENT DOCUMENTS

CN 1521070 A 8/2004
CN 102387947 A 3/2012
(Continued)

OTHER PUBLICATIONS

International Search Report and Written Opinion dated Jan. 21, 2020 in corresponding International PCT Application No. PCT/EP2019/058714, 9 pages.
(Continued)

*Primary Examiner* — Todd Melton
(74) *Attorney, Agent, or Firm* — Venable LLP; Jeffri A. Kaminski (57) ABSTRACT

The invention relates to a method for determining a parameter indicative of a road capability of a road segment supporting a vehicle. The vehicle comprises a plurality of ground engaging members. The method comprises: for each ground engaging member in a sub-set of the plurality of ground engaging members, setting a contact force between the ground engaging member and the road segment; determining a target global load vector to be imparted to the vehicle, the target global load vector comprising at least a vertical load and an inclining moment, determining contact forces for the ground engaging members of the plurality of ground engaging members which are not in the sub-set such that the contact forces for the plurality of ground engaging members together result in a resulting global load vector, a difference measure between the resulting global load vector and the target global load vector being equal to or lower than a predetermined difference measure threshold, applying the contact force to each ground engaging member of the
(Continued)

plurality of ground engaging members, for at least one ground engaging member in the sub-set, determining a parameter indicative of the road capability of the road segment associated with the ground engaging member.

24 Claims, 3 Drawing Sheets

(51) Int. Cl.
*B60W 10/22* (2006.01)
*B60W 40/068* (2012.01)

(52) U.S. Cl.
CPC ... *B60W 40/068* (2013.01); *B60G 2300/0262* (2013.01); *B60G 2300/14* (2013.01); *B60G 2400/60* (2013.01); *B60G 2400/822* (2013.01); *B60G 2800/019* (2013.01); *B60G 2800/70* (2013.01)

(56) References Cited

U.S. PATENT DOCUMENTS

| | | | |
|---|---|---|---|
| 2004/0046335 A1 | 3/2004 | Knox et al. | |
| 2010/0010710 A1 | 1/2010 | Kopp et al. | |
| 2017/0234689 A1 | 8/2017 | Gibson et al. | |
| 2019/0001988 A1 | 1/2019 | Ienaga et al. | |

FOREIGN PATENT DOCUMENTS

| | | |
|---|---|---|
| DE | 102007007282 A1 | 9/2007 |
| DE | 102008024093 A1 | 11/2009 |
| EP | 0246655 A1 | 11/1987 |
| EP | 1571014 A2 | 9/2005 |
| EP | 3071064 A1 | 9/2016 |
| HK | 1118768 A1 | 2/2009 |
| JP | 2005207953 A | 8/2005 |
| JP | 2008285006 A | 11/2008 |
| KR | 1020100135800 A | 10/2012 |
| KR | 1020150074750 A | 12/2016 |
| KR | 101864066 B1 | 7/2018 |
| WO | 2018010891 A1 | 1/2018 |
| WO | 2018220159 A1 | 12/2018 |

OTHER PUBLICATIONS

Japanese Office Action dated Apr. 4, 2023 in corresponding Japan Patent Application No. 2021-559293, 15 pages.
Korean Grant Decision dated Jun. 30, 2023 in corresponding Korean Patent Application No. 10-2021-7032895, 3 pages.
Chinese Office action dated Jul. 27, 2023 in corresponding Chines Patent Application No. 201980095145.5, 7 pages.

\* cited by examiner

METHOD AND A CONTROL UNIT FOR DETERMINING A PARAMETER INDICATIVE OF A ROAD CAPABILITY OF A ROAD SEGMENT SUPPORTING A VEHICLE

CROSS-REFERENCE TO RELATED APPLICATIONS

This application is a U.S. National Stage application of PCT/EP2019/058714, filed Apr. 5, 2019, and published on Oct. 8, 2020, as WO 2020/200484 A1, all of which is hereby incorporated by reference in its entirety.

TECHNICAL FIELD

The invention relates to a method for determining a parameter indicative of a road capability of a road segment supporting a vehicle. Moreover, the invention relates to a control unit for determining a parameter indicative of a road capability of a road segment supporting a vehicle. Furthermore, the invention relates to a vehicle.

The invention can be applied in heavy-duty vehicles, such as trucks, buses and construction equipment. Although the invention will be described with respect to a truck, the invention is not restricted to this particular vehicle, but may also be used in other vehicles such as buses and working machines.

BACKGROUND

When operating a vehicle, be it an autonomous vehicle or a manually operated vehicle, it may be beneficial to receive information indicative of the road capability of the road segment supporting the vehicle.

Purely by way of example, it may be desired to obtain information indicative of the friction between the road segment and ground engaging members of the vehicle. Such information can for instance be used for controlling the operation of the vehicle.

As another non-limiting example, it may be beneficial to obtain information relating to the load bearing capability of the road segment.

In order to determine a value indicative of a road surface friction coefficient, US 2019/001988 A1 proposes combining a first road surface friction coefficient on a basis of a vehicle information acquired from the vehicle with a second road surface friction coefficient on a basis of an external information acquired from an outside of the vehicle. When determining the first road surface friction coefficient, US 2019/001988 A1 proposes a change of the vehicle dynamics, such as initiating a braking or accelerating operation.

However, such a change of the vehicle dynamics may be perceived as inconvenient for an operator of the vehicle. Furthermore, the vehicle dynamics change may result in an undesired impact on for instance the cargo carried by a vehicle. Moreover, the change in vehicle dynamics may adversely affect the traffic surrounding the vehicle.

As such, irrespective of whether the vehicle is autonomous or manually operated, the vehicle dynamics change resulting from the method proposed by US 2019/001988 A1 may be less desired.

SUMMARY

An object of the invention is to provide a method for determining a parameter indicative of a road capability of a road segment supporting a vehicle, which method has a lower risk of resulting in an undesired vehicle dynamics change.

The object is achieved by a method according to claim 1.

As such, a first aspect of the present invention relates to a method for determining a parameter indicative of a road capability of a road segment supporting a vehicle. The vehicle comprises a plurality of ground engaging members.

The method comprises:

for each ground engaging member in a sub-set of the plurality of ground engaging members, setting a contact force between the ground engaging member and the road segment;

determining a target global load vector to be imparted to the vehicle, the target global load vector comprising at least a vertical load and an inclining moment, determining contact forces for the ground engaging members of the plurality of ground engaging members which are not in the sub-set such that the contact forces for the plurality of ground engaging members together result in a resulting global load vector, a difference measure between the resulting global load vector and the target global load vector being equal to or lower than a predetermined difference measure threshold, applying the contact force to each ground engaging member of the plurality of ground engaging members, for at least one ground engaging member in the sub-set, determining a parameter indicative of the road capability of the road segment associated with the ground engaging member.

By virtue of the method according to the present invention, it is possible to control the contact force to each ground engaging member in a manner such that a target global load vector is substantially obtained, i.e. reached within a certain difference measure threshold. Such a control implies that the contact force for one or more ground engaging members may be set to a level being suitable for determining inter alia the friction value or the load bearing capability of the ground segment supporting the vehicle while nevertheless ensuring that the target global load vector is substantially obtained. As will be elaborated on further hereinbelow, the target global load vector may for instance be indicative of a preferred inclination, such as a substantially zero inclination, of the vehicle. Instead, or in addition to, the preferred inclination, the target global load vector may be such that a previous condition of the vehicle is substantially maintained when modifying the contact forces.

Put differently, the method according to the present invention implies that a parameter indicative of a road capability of a road segment supporting a vehicle may be determined by setting the contact force for one or more ground engaging members whilst ensuring that the vehicle is not subjected to undesirably large motion changes, such as undesirably large inclination changes.

Optionally, determining the target global load vector comprises determining an initial global load vector imparted to the vehicle before the contact force is applied to each ground engaging member of the plurality of ground engaging members, preferably the method comprises setting the target global load vector equal to the initial global load vector.

As such, the method may result in that the initial global load vector, indicative of the vehicle's condition before controlling the contact forces, may be substantially unaltered when the contact forces are controlled. This in turn implies that the parameter indicative of the road capability may be determined without imparting the vehicle to excessive changes of the vehicle's behaviour. Consequently, the parameter indicative of the road capability may be determined without necessarily arriving at vehicle conditions that are perceived as inconvenient for an operator of the vehicle or which may result in an undesired impact on for instance the cargo carried by the vehicle.

Optionally, the vehicle has a longitudinal centre plane separating the vehicle into a first and a second longitudinal half, a first ground engaging member in the sub-set being located in the first longitudinal half and a second ground engaging member in the sub-set being located in the second longitudinal half.

Using ground engaging members in both longitudinal halves of a vehicle implies that the contact forces for two ground engaging members may be change without necessarily jeopardizing the stability of the vehicle.

Moreover, the use of ground engaging members in both longitudinal halves of a vehicle implies that the road capability can be determined for two tracks that the ground engaging members of the vehicle follow.

Optionally, applying the contact force to each ground engaging member of the plurality of ground engaging members comprises applying the contact force using a ramp function.

The application of the contact forces using a ramp function implies that the contact forces may be applied with a low risk of introducing an undesired dynamic behaviour to the vehicle.

Optionally, the plurality of ground engaging members comprises one or more wheels, preferably each ground engaging member of the plurality of ground engaging members being constituted by a wheel.

Optionally, the parameter indicative of the road capability of the road segment associated with the ground engaging member is a friction value between the ground engaging member and the road segment.

The friction value may be determined in a straightforward manner if the contact force can be controlled for a vehicle. Purely by way of example, the determination of the friction value may be determined with an appropriately high level of accuracy and with an appropriately small impact on the vehicle's overall behaviour if the contact force of relevant the ground engaging member is reduced, as compared to a previous "normal" driving condition of the vehicle.

Optionally, determining the friction value between the ground engaging member and the road segment comprises imparting a torque to the ground engaging member.

Optionally, imparting a torque to the ground engaging member comprises imparting the torque using the ramp function. As for the application of the contact forces using the ramp function, the application of a torque using the ramp function also implies a reduced risk of introducing an undesired dynamic behaviour to the vehicle.

Optionally, the parameter indicative of the road capability of the road segment associated with the ground engaging member is a load bearing capability value indicative of the load bearing capability of the ground segment supporting the vehicle.

As for the friction value, the load bearing capability may be determined in a straightforward manner if the contact force can be controlled for a vehicle. Purely by way of example, the contact force for a ground engaging member may be increased, as compared to a previous "normal" driving condition of the vehicle, and the depression of the ground engaging member may be determined to thereby establish a value indicative of the load bearing capability.

Optionally, the vehicle comprises a vehicle frame and a suspension system connecting the plurality of ground engaging members to the vehicle frame, the feature of applying the contact force to each ground engaging member of the plurality of ground engaging members comprising operating the suspension system.

Operating a suspension system may be an appropriate and cost efficient procedure for controlling the contact forces for the ground engaging members.

Optionally, each contact force comprises a normal force imparted to the related ground engaging member. As a further option, each contact force may be constituted by the normal force imparted to the related ground engaging member.

Optionally, at least one contact force comprises the normal force and a frictional force imparted to the related ground engaging member.

A second aspect of the present invention relates to a control unit for determining a parameter indicative of a road capability of a road segment supporting a vehicle. The vehicle comprises a vehicle frame, plurality of ground engaging members and a suspension system connecting the plurality of ground engaging members to the vehicle frame. The control unit is adapted to:

for each ground engaging member in a sub-set of the plurality of ground engaging members, set a contact force between the ground engaging member and the road segment;

determine a target global load vector to be imparted to the vehicle, the target global load vector comprising at least a vertical load and an inclining moment, determine contact forces for the ground engaging members of the plurality of ground engaging members which are not in the sub-set such that the contact forces for the plurality of ground engaging members together result in a resulting global load vector, a difference measure between the resulting global load vector and the target global load vector being equal to or lower than a predetermined difference measure threshold, issue information to the suspension system to impart the contact force to each ground engaging member of the plurality of ground engaging members, for at least one ground engaging member in the sub-set, determine a parameter indicative of the road capability of the road segment associated with the ground engaging member.

Optionally, the control unit is adapted to determine the target global load vector by determining an initial global load vector imparted to the vehicle before the contact force is applied to each ground engaging member of the plurality of ground engaging members, preferably the control unit is adapted to set the target global load vector equal to the initial global load vector.

Optionally, the vehicle has a longitudinal centre plane separating the vehicle into a first and a second longitudinal half, a first ground engaging member in the sub-set being located in the first longitudinal half and a second ground engaging member in the sub-set being located in the second longitudinal half.

Optionally, the control unit is adapted to issue information to the suspension system to apply the contact force to each ground engaging member of the plurality of ground engaging members using a ramp function.

Optionally, the parameter indicative of the road capability of the road segment associated with the ground engaging member is a friction value between the ground engaging member and the road segment.

Optionally, the control unit is adapted to determine the friction value between the ground engaging member and the road segment by issuing a signal to impart a torque to the ground engaging member.

Optionally, the control unit is adapted to issue a signal to impart a torque to the ground engaging member using the ramp function.

Optionally, the parameter indicative of the road capability of the road segment associated with the ground engaging member is a load bearing capability value indicative of the load bearing capability of the ground segment supporting the vehicle.

Optionally, each contact force comprises a normal force imparted to the related ground engaging member. As a further option, each contact force may be constituted by the normal force imparted to the related ground engaging member.

Optionally, at least one contact force comprises a normal force and a frictional force imparted to the related ground engaging member.

A third aspect of the present invention relates to a vehicle comprising a control unit according to the second aspect of the present invention.

Optionally, the plurality of ground engaging members comprises one or more wheels, preferably each ground engaging member of the plurality of ground engaging members being constituted by a wheel.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

The invention will be described below for a vehicle in the form of a truck 10 such as the truck illustrated in FIG. 1. The truck 10 should be seen as an example of a vehicle which could comprise a control unit according to the present invention of for which the method of the present invention could be carried out. However, the present invention may be implemented in a plurality of different types of vehicles. Purely by way of example, the present invention could be implemented in a truck, a tractor, a car, a bus, a work machine such as a wheel loader or any other type of construction equipment.

Figure 1:
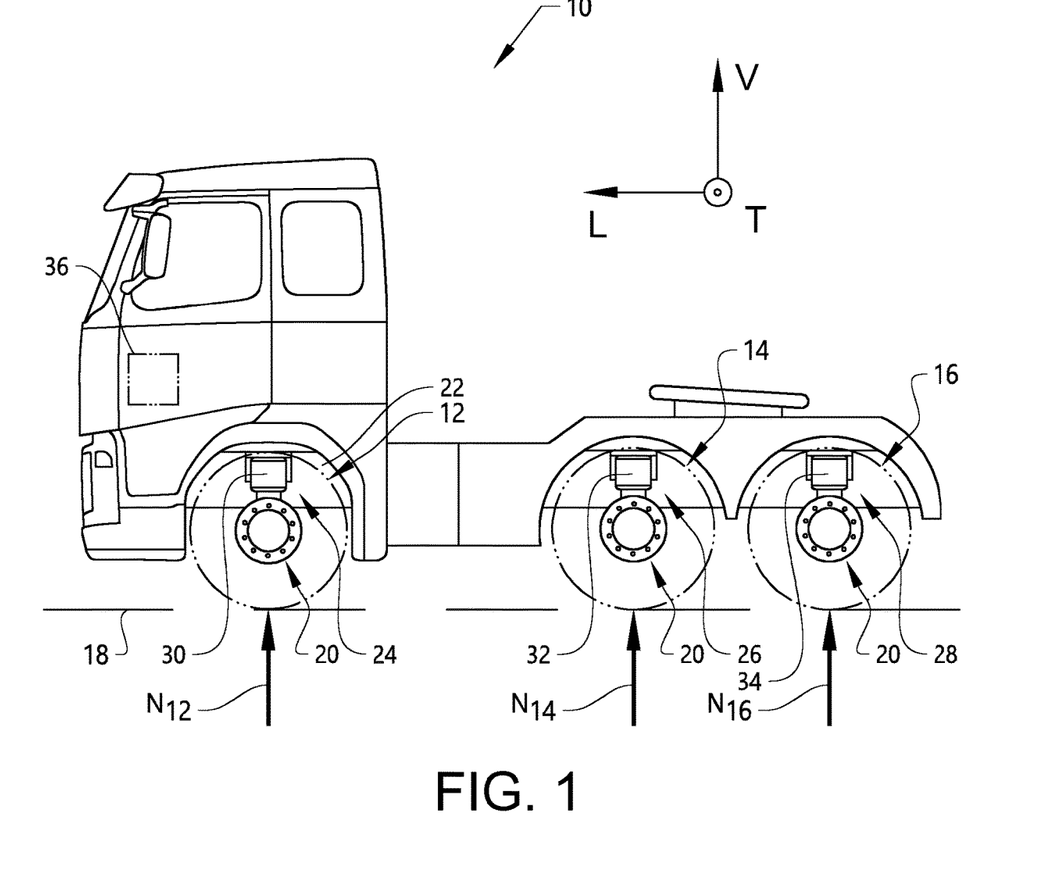
FIG. 1 is a schematic side view of a vehicle according to an embodiment of the present invention.

The FIG. 1 vehicle 10 comprises a set of ground engaging members. In the FIG. 1 embodiment, the ground engaging members are constituted by a set of wheels 12, 14, 16 each one of which being adapted to be supported by a ground segment 18. Although the FIG. 1 embodiment of the vehicle 10 comprises a pair of front wheels 12 and two pairs of rear wheels 14, 16, it is of course envisaged that other embodiments of the vehicle 10 may comprise fewer or more wheels. Furthermore, it is envisaged that other embodiments of the vehicle 10 may comprise other types of ground engaging members, such as crawlers (not shown).

Further, the FIG. 1 embodiment of the vehicle comprises a wheel suspension system 20 connecting the wheels 12, 14, 16 to a vehicle frame 22 of the vehicle 10. In the FIG. 1 implementation, the wheel suspension system 20 comprises a front wheel suspension system 24 connecting the vehicle frame 22 to the front wheel 12, a first rear wheel suspension system 26 connecting the vehicle frame 22 to the first rear wheel 14 and a second rear wheel suspension system 28 connecting the vehicle frame 22 to the second rear wheel 16.

Furthermore, as indicated in FIG. 1, the front wheel suspension system 24 may comprise a flexible bellow 30 into which gas can be added or drained. In a similar vein, each one of the first and second rear wheel suspension systems 26, 28 may comprise a flexible bellow 32, 34 into which gas can be added or drained. As such, the wheel suspension system 20 is arranged to damp/absorb loads from the respective wheel during motion of the vehicle 10. Furthermore, the wheel suspension system 20 can be used for controlling the contact force between the associated wheel 12, 14, 16 and the ground segment 18.

In the below description, reference is generally made to only one front wheel 12 and only two rear wheels 14, 16. However, it is to be understood that a reference to the front wheel 12 is equally applicable to the pair of front wheels. In a similar vein, a reference to the first rear wheel 14 is equally applicable to the pair of first rear wheels and a reference to the second rear wheel 16 is equally applicable to the pair of second rear wheels.

Additionally, FIG. 1 indicates that the vehicle extends in a longitudinal direction along a longitudinal axis L as well as in a vertical direction along a vertical axis V. The longitudinal axis L extends in a direction parallel to the intended direction of travel of the vehicle 10 and the vertical axis V extends in a direction being normal to the plane of the ground segment 18. FIG. 1 further illustrates that a transversal axis T extends perpendicular to each one of the longitudinal and vertical axes L, V.

The FIG. 1 vehicle 10 comprises a control unit 36 for determining a parameter indicative of a road capability of a road segment supporting a vehicle. Although FIG. 1 illustrates an embodiment in which the control unit 36 is physically connected to the vehicle 10, e.g. located in the vehicle 10 as illustrated in FIG. 1, the control unit 36 according to the second aspect of the present invention need not necessarily be physically connected to the vehicle 10. Instead, embodiments of the control unit 36 are contemplated in which the control unit 36 is separate from the vehicle 10 and adapted to communicate with the vehicle 10 using e.g. a wireless communication system (not shown).

Figure 2:
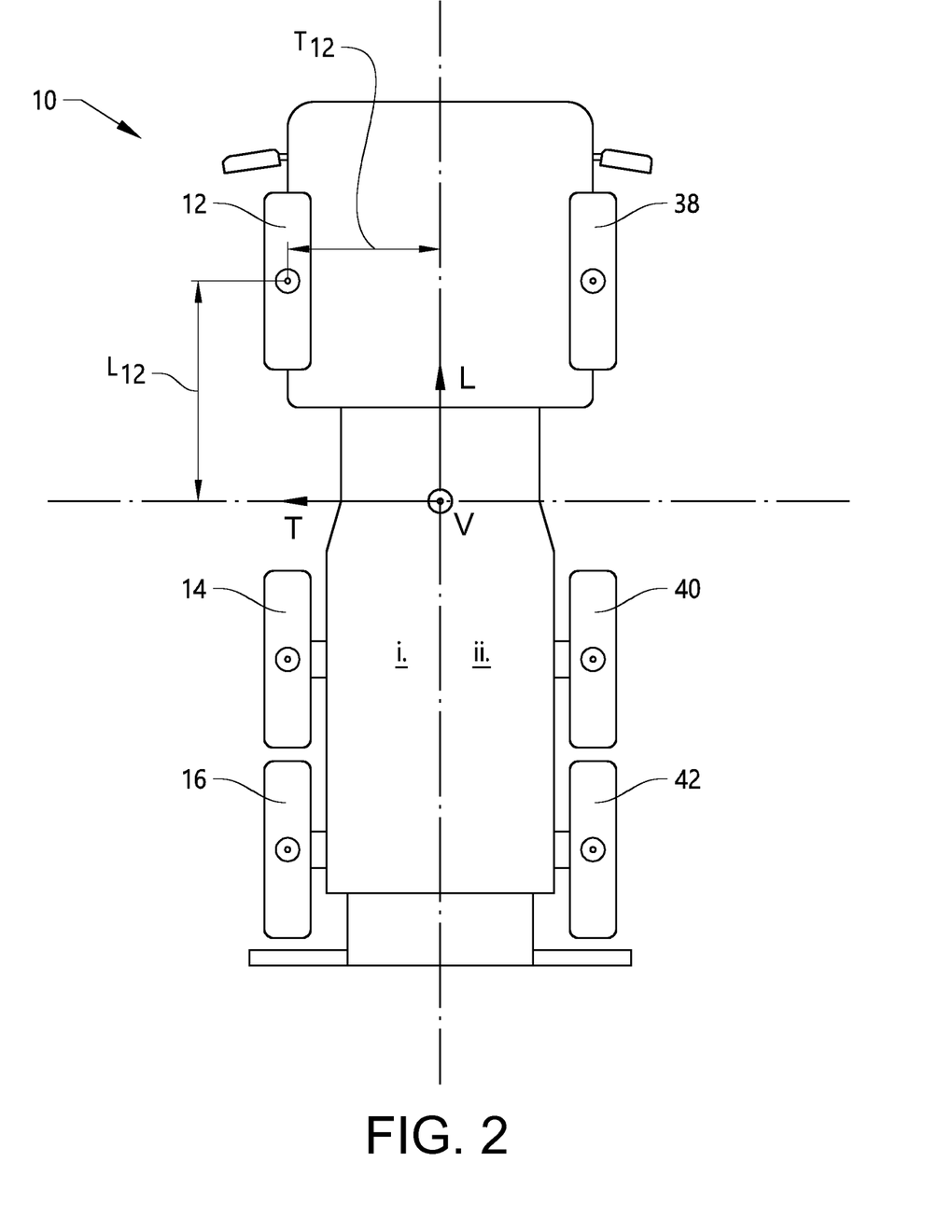
FIG. 2 is a schematic top view of a vehicle according to an embodiment of the present invention.

The control unit 36 is suitable for determining a parameter indicative of a road capability of a road segment supporting a vehicle. An embodiment of the control unit 36 and its function will be presented hereinbelow with reference to FIG. 2 schematically illustrating a top view of a vehicle 10 comprising six ground engaging members 12, 14, 16, 38, 40, 42 each one of which being exemplified as a wheel. Here, it should again be noted that embodiments of the control unit 36 may be adapted to control vehicles having fewer or more ground engaging members than the FIG. 2 number of six.

The control unit 36 is adapted to set a contact force between the ground engaging member and the road segment for each ground engaging member in a sub-set of the plurality of ground engaging members. In the example illustrated in FIG. 2, the sub-set comprises two wheels, viz the first rear wheel 14 on the left hand side and the second rear wheel 42 on the right hand side of the vehicle 10.

The term contact force may be constituted by a normal force only between the ground engaging member and the road segment, for instance in a situation when the vehicle 10 is located on a flat surface. However, it is also envisaged that the contact force may be the resulting force from the normal force and a frictional force, such as a static frictional force. For instance, in a situation when the vehicle 10 is stationary on an inclined surface, the normal force as well as the frictional force may form the contact force.

As another non-limiting example, a dynamic frictional force may be included in the contact force. For instance, if a certain torque change is to be imparted to a ground engaging member, for instance in order to determine a friction value, an expected frictional force may be determined on the basis of the torque change and such a frictional force may form part of the contact force to be set for that ground engaging member.

In order to keep the below description relatively brief, a condition is used in which the contact force equals the normal force for each ground engaging member. However, the below description and the below equations can be expanded in a straightforward manner so as to cover also situations in which the contact force for a ground engaging member is the force resulting from normal and frictional forces imparted to the ground engaging member.

As such, and as indicated in FIG. 2, the vehicle 10 has a longitudinal centre plane, formed by the longitudinal axis L and the vertical axis V in FIG. 2, separating the vehicle 10 into a first i. and a second ii. longitudinal half. Further, a first ground engaging member 14 in the sub-set may preferably be located in the first longitudinal half i. and a second ground engaging member 42 in the sub-set may preferably be located in the second longitudinal half ii. Such a selection of the ground engaging members may in particular be preferred when the vehicle 10 comprises six ground engaging members or more since the contact force control of at least one ground engaging member on either side of the longitudinal halves can be obtained without resulting in an undesirably low stability of the vehicle 10.

The contact force between the left first rear wheel 14 and the road segment 18, which contact force in the FIG. 2 situation is constituted by a normal force imparted to the left first rear wheel 14, is set to a certain value $N_{14,S}$. The value of the contact force, here exemplified as the value of the normal force, may be dependent on the type of road capability for which a parameter is to be determined. For instance, in the even that a friction value is to be determined, the value $N_{14,S}$ may be set so as to be relatively low. On the other hand, in the even that a load bearing capability is to be determined, the value $N_{14,S}$ may be set so as to be relatively high.

In a similar vein the contact force between the right second rear wheel 42 and the road segment 18, which contact force in the FIG. 2 situation is constituted by a normal force imparted to the right second rear wheel 42, is set to a certain value $N_{42,S}$. In the above presentation, the subscript S indicates that a contact force that is set.

The values to which the contact force may be set for each ground engaging member in a sub-set of the plurality of ground engaging members may be determined in a plurality of ways. Purely by way of example, the contact force values may be predetermined. As another example, the contact force values may be determined on the basis of the weight of the vehicle. For instance, the contact force values may set so as to be predetermined fractions of the weight of the vehicle 10.

Moreover, the control unit 36 is adapted to determine a target global load vector G to be imparted to the vehicle 10. The target global load vector G comprises at least a vertical load $F_V$ and an inclining moment M.

An example of target global load vector G is presented below, which target global load vector G comprises a vertical load $F_V$, a roll inclining moment $M_L$ and a pitch inclining moment $M_T$ in accordance with the following:

$$G = \begin{bmatrix} F_{VG} \\ M_{LG} \\ M_{TG} \end{bmatrix}. \quad \text{(Eq. 1)}$$

With reference to FIG. 2, the vertical load $F_{VG}$ relates to a load out of the FIG. 2 plane, viz in a direction along the vertical axis V. Moreover, the roll inclining moment $M_{LG}$ relates to a moment around the longitudinal axis L and the pitch inclining moment $M_{TG}$ relates to a moment around the transversal axis T.

The control unit 36 is adapted to determine contact forces $N_{12}$, $N_{16}$, $N_{38}$, $N_{40}$ for the ground engaging members of the plurality of ground engaging members which are not in the sub-set such that the contact forces for the plurality of ground engaging members together result in a resulting global load vector R. Again, in order to keep the description relatively brief, the contact forces $N_{12}$, $N_{16}$, $N_{38}$, $N_{40}$ are exemplified as normal forces. A difference measure DM between the resulting global load vector R and the target global load vector G is equal to or lower than a predetermined difference measure threshold. An example of the resulting global load vector R is presented in Eq. 2 hereinbelow.

$$R = \begin{bmatrix} F_{VR} \\ M_{LR} \\ M_{TR} \end{bmatrix}. \quad \text{(Eq. 2)}$$

For a certain set of contact forces, the resulting global load vector R can be determined in accordance with the following:

$$R = \begin{bmatrix} 1 & 1 & 1 & 1 & 1 & 1 \\ T_{12} & T_{14} & T_{16} & T_{38} & T_{40} & T_{42} \\ L_{12} & L_{14} & L_{16} & L_{38} & L_{40} & L_{42} \end{bmatrix} \begin{bmatrix} N_{12} \\ N_{14,S} \\ N_{16} \\ N_{38} \\ N_{40} \\ N_{42,S} \end{bmatrix} \quad \text{(Eq. 3)}$$

wherein:

$T_{ij}$ is the distance along the transversal axis T between the point of attack of the contact force $N_{ij}$ and the longitudinal axis L, and $L_{ij}$ is the distance along the longitudinal axis L between the point of attack of the contact force $N_{ij}$ and the transversal axis T.

As has been indicated above, Eq. 3 is based on the assumption that the contact forces $N_{12}$, $N_{14,S}$, $N_{16}$, $N_{38}$, $N_{40}$, $N_{42,S}$ are constituted by normal forces. However, the present description and for instance Eq. 3 can be expanded so as to cover contact forces that comprise a normal force component and a frictional force component. In this respect, a non-limiting example is presented hereinbelow with reference to Eq. 7.

The above two distances $T_{12}$, $L_{12}$ are illustrated in FIG. 2 for the contact force $N_{12}$ imparted to the left front wheel 12. It should be noted that the distances $T_{ij}$ and $L_{ij}$ are generally fixed since the location of each ground engaging member relative to the vehicle 10, e.g. relative to the vehicle frame (not shown in FIG. 2), generally is fixed.

Purely by way of example, the difference measure DM between the resulting global load vector R and the target global load vector G may be determined by calculating the Euclidian norm between the two vectors. As such, a difference vector D may be calculated in accordance with the following: D=G−R and the difference measure DM may then be determined as the Euclidian norm of the difference vector, viz:

$$DM = \sqrt{D^T \cdot D}.\qquad\text{(Eq. 4)}$$

As such, the control unit 36 may be adapted to determine values of the contact forces $N_{12}$, $N_{16}$, $N_{38}$, $N_{40}$ for the ground engaging members of the plurality of ground engaging members which are not in the sub-set such that the difference measure DM is equal to or lower than a predetermined difference measure threshold.

Purely by way of example, the control unit 36 may be adapted to employ an iterative process in order to determine values of the contact forces $N_{12}$, $N_{16}$, $N_{38}$, $N_{40}$. As a non-limiting example, such an iterative process may comprise constraints in terms of predetermined minimum and maximum values for each one of the contact forces $N_{12}$, $N_{16}$, $N_{38}$, $N_{40}$.

As an alternative to the procedure discussed hereinabove with relations to Eq. 1-Eq. 4, values of the contact forces $N_{12}$, $N_{16}$, $N_{38}$, $N_{40}$ may be determined using another equation system by combining Eq. 1 and Eq. 3 as follows:

$$\begin{bmatrix} F_{VG} \\ M_{LG} \\ M_{TG} \\ N_{14,S} \\ N_{42,S} \end{bmatrix} = \begin{bmatrix} 1 & 1 & 1 & 1 & 1 & 1 \\ T_{12} & T_{14} & T_{16} & T_{38} & T_{40} & T_{42} \\ L_{12} & L_{14} & L_{16} & L_{38} & L_{40} & L_{42} \\ 0 & 1 & 0 & 0 & 0 & 0 \\ 0 & 0 & 0 & 0 & 0 & 1 \end{bmatrix} \begin{bmatrix} N_{12} \\ N_{14} \\ N_{16} \\ N_{38} \\ N_{40} \\ N_{42} \end{bmatrix} \qquad\text{(Eq. 5)}$$

As for Eq. 1-Eq. 4, though again purely by way of example, the control unit 36 may be adapted to solve Eq. 5 using an iterative process in order to determine values of the contact forces $N_{12}$, $N_{16}$, $N_{38}$, $N_{40}$. As s non-limiting example, such an iterative process may comprise constraints in terms of predetermined minimum and maximum values for each one of the contact forces $N_{12}$, $N_{16}$, $N_{38}$, $N_{40}$.

Furthermore, irrespective of whether the control unit 36 uses Eq. 1-Eq. 4 or Eq. 5 hereinabove, the relation between the number of unknown parameters i.e. the contact forces $N_{12}$, $N_{16}$, $N_{38}$, $N_{40}$ in the above example—and the number of rows of the equation system will determine whether a single or a plurality of possible solutions exist.

In the event that the number of unknown parameters equals the number of rows of the equation system, a single solution exists. On the other hand, should the number of unknown parameters be smaller or greater than the number of rows of the equation system, a plurality of solutions may exist.

Irrespective of how the control unit 36 is adapted to determine the contact forces $N_{12}$, $N_{16}$, $N_{38}$, $N_{40}$ for the ground engaging members of the plurality of ground engaging members which are not in the sub-set, the control unit 36 is adapted to issue information to the suspension system 20 to impart the contact force $N_{12}$, $N_{14,S}$, $N_{16}$, $N_{38}$, $N_{40}$, $N_{42,S}$ to each ground engaging member 12, 14, 16, 38, 40, 42 of the plurality of ground engaging members.

As a non-limiting example, the control unit 36 may be adapted to issue information to the suspension system to apply the contact force $N_{12}$, $N_{14,S}$, $N_{16}$, $N_{38}$, $N_{40}$, $N_{42,S}$ to each ground engaging member 12, 14, 16, 38, 40, 42 of the plurality of ground engaging members using a ramp function. Purely by way of example, the ramp function may be a linear ramp function changing a contact force from an initial contact force to the desired contact force during a predetermined ramp time.

Furthermore, the control unit 36 is adapted to determine a parameter indicative of the road capability of the road segment associated with the ground engaging member for at least one ground engaging member 14, 42 in the sub-set.

As a non-limiting example, the parameter indicative of the road capability of the road segment associated with the ground engaging member can be a friction value p between the ground engaging member 14, 42 and the road segment 18. Purely by way of example, the control unit 36 may be adapted to determine the friction value p between the ground engaging member and the road segment by issuing a signal to impart a torque to the ground engaging member 14, 42.

As a non-limiting example, the signal to impart a torque to the ground engaging member 14, 42 may be a signal to increase or decrease the torque imparted to the ground engaging member 14, 42, as compared to the torque imparted to the ground engaging member 14, 42 before commencing the friction value p determination. For instance, using the ground engaging member 14 as an example, in a situation in which the value $N_{14,S}$ is set so as to be relatively low, the torque can be selected such that the rotational speed of the ground engaging member 14 is lower than what would be expected in view of the current speed of the vehicle 10. In the above example in which the contact forces are applied using a ramp function, the control unit 36 may be adapted issue a signal to impart a torque to the ground engaging member using the ramp function discussed hereinabove.

Instead of, or in addition to, the friction value p, the parameter indicative of the road capability of the road segment associated with the ground engaging member is a load bearing capability value indicative of the load bearing capability of the ground segment 18 supporting the vehicle 10. Purely by way of example, using the ground engaging member 14 as an example, in a situation in which the value $N_{14,S}$ is set so as to be relatively high, the vertical depression of the ground engaging member 14 into the ground segment 18 can be determined such that a stiffness of the ground segment 18 can be determined.

The target global load vector G may be determined in a plurality of ways. Purely by way of example, the target global load vector G may be determined such that a desired condition of the vehicle 10, for instance in terms of a desired roll and/or pitch, is obtained. As another non-limiting example, the target global load vector G may be selected such that a required stability of the vehicle 10 is obtained. Purely by way of example, the required stability may be determined taking a stability influence into account, which stability influence emanates from the procedure of determining the parameter indicative of the road capability of the road segment associated with the ground engaging member.

As another non-limiting example, the target global load vector G may be determined by by determining an initial global load vector I imparted to the vehicle before the contact force is applied to each ground engaging member of the plurality of ground engaging members. For instance, the control unit 36 may be adapted to set the target global load vector G equal to the initial global load vector I.

The initial global load vector I may be determined in a plurality of ways. For instance, when it is possible to determine actual contact forces $N_{12,A}$, $N_{14,A}$, $N_{16,A}$, $N_{38,A}$, $N_{40,A}$, $N_{42,A}$ of each ground engaging member 12, 14, 16, 38, 40, 42, such as when the vehicle 10 comprises a ground engaging member load sensor (e.g. a wheel load sensor) for each ground engaging member 12, 14, 16, 38, 40, 42, the initial global load vector I may be determined using Eq. 3.

$$I = \begin{bmatrix} 1 & 1 & 1 & 1 & 1 & 1 \\ T_{12} & T_{14} & T_{16} & T_{38} & T_{40} & T_{42} \\ L_{12} & L_{14} & L_{16} & L_{38} & L_{40} & L_{42} \end{bmatrix} \begin{bmatrix} N_{12,A} \\ N_{14,A} \\ N_{16,A} \\ N_{38,A} \\ N_{40,A} \\ N_{42,A} \end{bmatrix} \quad \text{(Eq. 6)}$$

The invention also relates to a method for determining a parameter indicative of a road capability of a road segment 18 supporting a vehicle 10. The vehicle 10 comprises a plurality of ground engaging members 12, 14, 16, 38, 40, 42. A flow chart of an embodiment of the method according to the present invention is presented on FIG. 3.

Figure 3:
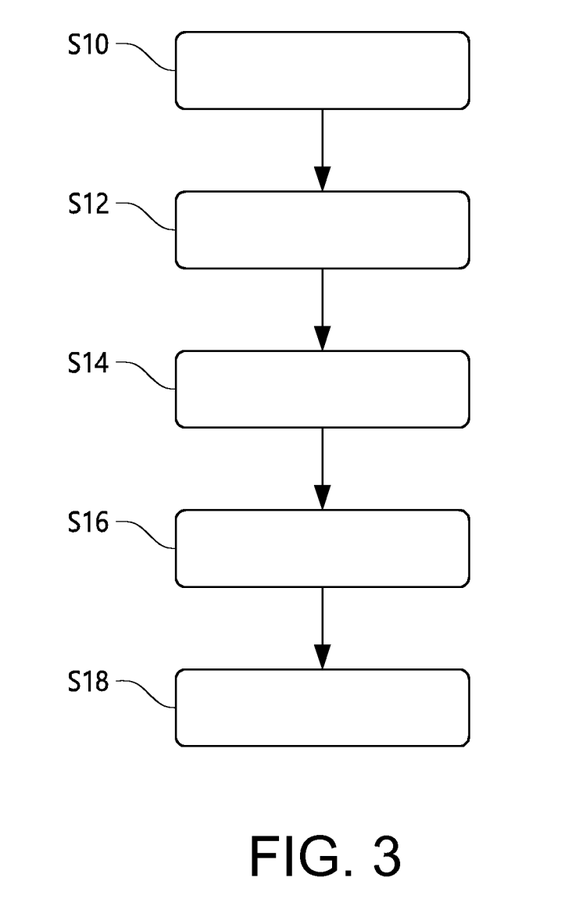
FIG. 3 is a flow chart illustrating an embodiment of a method according to the present invention.

With reference to FIG. 3, the method embodiment comprises:

S10 for each ground engaging member 14, 42 in a sub-set of the plurality of ground engaging members, setting a contact force $N_{14,S}$, $N_{42,S}$ between the ground engaging member 14, 42 and the road segment 18;

S12 determining a target global load vector G to be imparted to the vehicle 10, the target global load vector G comprising at least a vertical load and an inclining moment, S14 determining contact forces $N_{12}$, $N_{16}$, $N_{38}$, $N_{40}$ for the ground engaging members 12, 16, 38, 40 of the plurality of ground engaging members which are not in the sub-set such that the contact forces $N_{12}$, $N_{14}$, $N_{16}$, $N_{38}$, $N_{40}$, $N_{42}$ for the plurality of ground engaging members together result in a resulting global load vector R, a difference measure DM between the resulting global load vector R and the target global load vector G being equal to or lower than a predetermined difference measure threshold, S16 applying the contact force to each ground engaging member of the plurality of ground engaging members, S18 for at least one ground engaging member in the sub-set, determining a parameter indicative of the road capability of the road segment associated with the ground engaging member.

The above method may for instance be carried out using the control unit 36 discussed hereinabove. However, it is also envisaged that the method according to the present invention may be carried out using other means.

The above method feature S16 of applying the contact forces may be achieved using a vehicle suspension system, such as the FIG. 1 vehicle suspension system 20. However, it is also contemplated that embodiments of the method may employ other means for applying the contact forces.

It is to be understood that the present invention is not limited to the embodiments described above and illustrated in the drawings; rather, the skilled person will recognize that many changes and modifications may be made within the scope of the appended claims. For instance, although the equations Eq. 1-Eq. 6 presented hereinabove only include normal forces for each ground engaging member, the equations could be expanded so as to include a situation in which the contact force of one or more ground engaging members comprises a frictional force in addition to the normal force.

As such, using Eq. 3 as an example and assuming that the contact force to be set for the left first rear wheel 14 in FIG. 2 comprises the normal force $N_{14,S}$ as well as a frictional force $F_{L14,S}$ in the direction of the longitudinal axis L, Eq. 3 could be modified in accordance with the following:

$$R = \begin{bmatrix} F_{LR} \\ F_{VR} \\ M_{LR} \\ M_{TR} \end{bmatrix} = \begin{bmatrix} 1 & 0 & 0 & 0 & 0 & 0 & 0 \\ 0 & 1 & 1 & 1 & 1 & 1 & 1 \\ 0 & T_{12} & T_{14} & T_{16} & T_{38} & T_{40} & T_{42} \\ V_{12} & L_{12} & L_{14} & L_{16} & L_{38} & L_{40} & L_{42} \end{bmatrix} \begin{bmatrix} F_{L14,S} \\ N_{12} \\ N_{14,S} \\ N_{16} \\ N_{38} \\ N_{40} \\ N_{42,S} \end{bmatrix} \quad \text{(Eq. 7)}$$

wherein:

$V_{12}$ is the distance along the vertical axis V between the point of attack of the frictional force $F_{L14,S}$ and the transversal axis T.

Eq. 7 can be expanded further by for instance adding a frictional force $F_{T14,S}$ in the direction of the transversal axis T to the contact force of the left first rear wheel 14 in FIG. 2 and/or by for example adding horizontal force components to any one of the other ground engaging members.

The invention claimed is:

1. A method for determining a parameter indicative of a road capability of a road segment supporting a vehicle, said vehicle comprising a plurality of ground engaging members, said method comprising:

for each ground engaging member in a sub-set of said plurality of ground engaging members, setting a contact force between said ground engaging member and said road segment;

determining a target global load vector to be imparted to said vehicle, said target global load vector comprising at least a vertical load and an inclining moment, determining contact forces for the ground engaging members of said plurality of ground engaging members which are not in said sub-set such that the contact forces for said plurality of ground engaging members together result in a resulting global load vector, a difference measure between said resulting global load vector and said target global load vector being equal to or lower than a predetermined difference measure threshold, applying said contact force to each ground engaging member of said plurality of ground engaging members, for at least one ground engaging member in said sub-set, determining a parameter indicative of the road capability of the road segment associated with the ground engaging member.

2. The method according to claim 1, wherein determining said target global load vector comprises determining an initial global load vector imparted to said vehicle before said contact force is applied to each ground engaging member of said plurality of ground engaging members, preferably said method comprises setting said target global load vector equal to said initial global load vector.

3. The method according to claim 1, wherein said vehicle has a longitudinal centre plane separating said vehicle into a first and a second longitudinal half, a first ground engaging member in said sub-set being located in said first longitudinal half and a second ground engaging member in said sub-set being located in said second longitudinal half.

4. The method according to claim 1, wherein applying said contact force to each ground engaging member of said plurality of ground engaging members comprises applying said contact force using a ramp function.

5. The method according to claim 1, wherein said plurality of ground engaging members comprises one or more wheels, preferably each ground engaging member of said plurality of ground engaging members being constituted by a wheel.

6. The method according to claim 5, wherein said parameter indicative of the road capability of the road segment associated with the ground engaging member is a friction value between said ground engaging member and said road segment.

7. The method according to claim 1, wherein determining said friction value between said ground engaging member and said road segment comprises imparting a torque to said ground engaging member.

8. The method according to claim 7, wherein imparting a torque to said ground engaging member comprises imparting said torque using said ramp function.

9. The method according to claim 1, wherein said parameter indicative of the road capability of the road segment associated with the ground engaging member is a load bearing capability value indicative of the load bearing capability of said ground segment supporting said vehicle.

10. The method according to claim 1, wherein said vehicle comprises a vehicle frame and a suspension system connecting the plurality of ground engaging members to said vehicle frame, said feature of applying said contact force to each ground engaging member of said plurality of ground engaging members comprising operating said suspension system.

11. The method according to claim 1, wherein each contact force comprises a normal force imparted to the related ground engaging member.

12. The method according claim 11, wherein at least one contact force comprises the normal force and a frictional force imparted to the related ground engaging member.

13. A control unit for determining a parameter indicative of a road capability of a road segment supporting a vehicle, said vehicle comprising a vehicle frame, plurality of ground engaging members and a suspension system connecting the plurality of ground engaging members to said vehicle frame, said control unit being adapted to:
    for each ground engaging member in a sub-set of said plurality of ground engaging members, set a contact force between said ground engaging member and said road segment;
    determine a target global load vector to be imparted to said vehicle, said target global load vector comprising at least a vertical load and an inclining moment,
    determine contact forces for the ground engaging members of said plurality of ground engaging members which are not in said sub-set such that the contact forces for said plurality of ground engaging members together result in a resulting global load vector, a difference measure between said resulting global load vector and said target global load vector being equal to or lower than a predetermined difference measure threshold,
    issue information to said suspension system to impart said contact force to each ground engaging member of said plurality of ground engaging members,
    for at least one ground engaging member in said sub-set, determine a parameter indicative of the road capability of the road segment associated with the ground engaging member.

14. The control unit according to claim 13, wherein said control unit is adapted to determine said target global load vector by determining an initial global load vector imparted to said vehicle before said contact force is applied to each ground engaging member of said plurality of ground engaging members, preferably said control unit is adapted to set said target global load vector equal to said initial global load vector.

15. The control unit according to claim 13, wherein said vehicle has a longitudinal centre plane separating said vehicle into a first and a second longitudinal half, a first ground engaging member in said sub-set being located in said first longitudinal half and a second ground engaging member in said sub-set being located in said second longitudinal half.

16. The control unit according to claim 13, wherein said control unit is adapted to issue information to said suspension system to apply said contact force to each ground engaging member of said plurality of ground engaging members using a ramp function.

17. The control unit according to claim 13, wherein said parameter indicative of the road capability of the road segment associated with the ground engaging member is a friction value between said ground engaging member and said road segment.

18. The control unit according to claim 17, wherein said control unit is adapted to determine said friction value between said ground engaging member and said road segment by issuing a signal to impart a torque to said ground engaging member.

19. The control unit according to claim 18, wherein said control unit is adapted to issue a signal to impart a torque to said ground engaging member using said ramp function.

20. The control unit according to claim 13, wherein said parameter indicative of the road capability of the road segment associated with the ground engaging member is a load bearing capability value indicative of the load bearing capability of said ground segment supporting said vehicle.

21. The control unit according to claim 13, wherein each contact force comprises a normal force imparted to the related ground engaging member.

22. The control unit according to claim 21, wherein at least one contact force comprises the normal force and a frictional force imparted to the related ground engaging member.

23. A vehicle comprising a control unit according to claim 13.

24. A vehicle according to claim 23, wherein said plurality of ground engaging members comprises one or more wheels, preferably each ground engaging member of said plurality of ground engaging members being constituted by a wheel.

* * * * *